United States Patent [19]
Olshansky

[11] Patent Number: 5,854,699
[45] Date of Patent: Dec. 29, 1998

[54] MULTIPLEXED SUBCARRIER CONTROL IN WAVELENGTH DIVISION MULTIPLEXED BROADBAND NETWORKS

[75] Inventor: Robert Olshansky, Wayland, Mass.

[73] Assignee: GTE Laboratories Incorporated, Waltham, Mass.

[21] Appl. No.: 775,040

[22] Filed: Dec. 30, 1996

Related U.S. Application Data

[60] Continuation-in-part of Ser. No. 366,179, Dec. 29, 1994, abandoned, which is a division of Ser. No. 100,513, Jul. 30, 1993, abandoned.

[51] Int. Cl.$^6$ .............................. H04B 10/14; H04J 14/02
[52] U.S. Cl. .......................... 359/125; 359/152; 359/180; 359/189
[58] Field of Search .................................. 359/123, 124, 359/125, 133, 165, 152, 180, 188, 189, 195

[56] References Cited

U.S. PATENT DOCUMENTS

| | | | |
|---|---|---|---|
| 4,330,869 | 5/1982 | Robieux | 455/607 |
| 4,710,914 | 12/1987 | Robieux | 370/3 |
| 5,212,577 | 5/1993 | Nakamura et al. | 359/124 |
| 5,289,302 | 2/1994 | Eda | 359/123 |
| 5,301,053 | 4/1994 | Shikada | 359/125 |
| 5,327,276 | 7/1994 | Shimosaka et al. | 359/125 |
| 5,365,344 | 11/1994 | Eda et al. | 359/124 |
| 5,367,361 | 11/1994 | Noll et al. | 359/125 |
| 5,369,515 | 11/1994 | Majima | 359/125 |
| 5,452,115 | 9/1995 | Tomioka | 359/125 |
| 5,612,806 | 3/1997 | Su et al. | 359/125 |

FOREIGN PATENT DOCUMENTS

| | | | |
|---|---|---|---|
| 63-90229 (A) | 4/1988 | Japan | H04B 9/00 |
| 63-198426 (A) | 8/1988 | Japan | H04B 9/00 |
| 2 224 902 | 5/1990 | United Kingdom | H04B 9/00 |
| WO 91/09478 | 6/1991 | WIPO | H04G 11/00 |

OTHER PUBLICATIONS

Brackett, Charles, A. Dense Wavelength Division Multiplexing Netrworks: Principles and Applications, IEEE Journal on Selected Areas in Communications, vol. 8, No. 6, Aug. 1990, pp. 948–964.

Dono, Nicholas, R. et al, A Wavelength Division Multiple Access Network for Computer Communication, IEEE Journal on Selected Areas in Communications, vol. 8, No. 8, Aug. 1990, pp. 983–994.

Goodman, Matthew, S., et al., The Lambdanet Multiwavelength Network: Architecture, applications, and Demonstrations, IEEE Journal on Selected Areas in Communications. vol. 8, No. 6, Aug. 1990, pp. 995–1004.

Wagner, Stuart, s., et al., A Passive Photonic Loop Architecture Employing Wavelength–Division Multiplexing, Bell Communications Research, IEEE Publication No. CH–2535–3/88/0000–1569, Mar. 1988, Ch. 48.1.1, pp. 1589–1573.

(List continued on next page.)

*Primary Examiner*—Leslie Pascal
*Attorney, Agent, or Firm*—Leonard Charles Suchyta

[57] ABSTRACT

In a wavelength division multiplexed network having a plurality of nodes and having optical channels at wavelengths $\lambda i$, where $i=1 \ldots N$, for transmission of optical signals over optical interconnection means, control for informing the network of which nodes are transmitting at which frequencies and for token holding. Control is provided without the need for a second transmitter at each node and another control channel. Data signals are provided at baseband by keying the optical signal at a data repetition rate. Control signals are imposed on a wavelength $\lambda t$ of a transmitting node as a subcarrier. Receiver means at each node respond to a $\lambda t$ from another channel to receive information. The node also includes means for all wavelengths $\lambda i$ and demodulating the subcarrier therefrom to derive control information. Means are provided for producing controls signals each corresponding to a channel and formatting the serial control sequence so that the data rate for control information does not increase as a function of network traffic.

6 Claims, 2 Drawing Sheets

OTHER PUBLICATIONS

Glance, B., et al., *Densely Spaced WDM Coherent Optical Star Network*, Electronics Letters 13th Aug. 1987, vol. 23, No. 17, pp. 875–876.

Maeda, M.W., et al., *Wavelength–division multiple access network based on centralized common–wavelength control*, Tuesday Afternoon, Program of Optical Fiber Conference '92, pp. 84–85.

Way, W.I., et al., *Self routing WDM high capacity SONET ring network*, Tuesday Afternoon, Program of Optical Fiber Conference '92, pp. 86–87.

Su, Shing fong, et al, *Performance of Multiple Access WDM Networks with Subcarrier Control Channels*, GTE Laboratories, Incorporated, Waltham, Massachuesetts, presentaion more than one year prior to filing of this application.

MULTIPLEXED SUBCARRIER CONTROL IN WAVELENGTH DIVISION MULTIPLEXED BROADBAND NETWORKS

RELATED PATENT APPLICATIONS

This is a continuation in part of application Ser. No. 08/366,179 filed Dec. 29, 1994, now abandon which is a division of application Ser. No. 08/100,513 filed Jul. 30, 1993 now abandoned.

1. Field of Invention

The present invention relates to wavelength division multiplexed broadband networks, and more particularly to means for controlling such networks.

2. Background of the Invention

The present invention finds particular utility in local area networks (LANs) as well as in other networks. LANs with fiber optic cables may interconnect computers or other digital devices to digital devices within the distance constraints of optical fibers and couplings, or, through gateways, to devices virtually anywhere. Single mode optical fibers have been used for interconnection due to their high bandwidth capabilities. The technique of wavelength division multiplexing in broadband networks was developed in an effort to take full advantage of this high bandwidth capability.

Wavelength division multiplexed broadband networks described in, for example: Networks: Principles and Applications, *Journal of Sel. Areas Commun.*, vol. 8, pp. 948–964, 1990; R. N. Dono et al., "A Wavelength Division Multiple Access Network for Computer Communications", *Journal of Sel. Areas Commun.*, vol. 8, pp. 983–994, 1990; M. S. Goodman et al., "The LAMBDANET Multiwavelength Network: Architecture, Applications, and Demonstrations, *Journal of Sel. Areas Commun.*, vol. 8, pp. 995–1004, 1990; S. S. Wagner et al., "A Passive Photonic Loop Architecture Employing Wavelength Division Multiplexing" *Conf. Proc* GLOBECOM'88, pp. 1569– 1573, 1988; and B. Glance et al., Densely Spaced WDM Coherent Optical Star Network", *Electron. Let*, vol. 23, pp. 875–876, 1987.

Wavelength division is done over the optical bandwidth of the fiber optic cable. In an example in which a fiber optic cable has a bandwidth extending from $\lambda 1$ to $\lambda 2$. This range defines a baseband. The baseband is divided into N channels. Each channel is centered at a wavelength $\lambda i$, where $i=1-N$. N nodes may transmit or receive simultaneously. Optical transmission means and receiving means, commonly solid state laser transmitters and receivers, are provided at each node. Transmitters and receivers may each be fixed or tunable. Each node may transmit at either a fixed wavelength or be tunable to a selected$\lambda i$. Each receiver may be responsive to a single wavelength $\lambda i$ or be tunable to any wavelength $\lambda i$.

Various forms of dense wavelength division multiplexed broadband networks are well known. Example of networks with fixed wavelength transmitters and fixed wavelength receivers at each node include AT&T's Multihop Networks and Bellcore's LAMBDANET. A fixed transmitter and tunable receiver are included in the IBM Rainbow Network. Many other forms are known.

In each wavelength division multiplexed network, control signals must be provided. Control signals commonly take the form of control packets each including a plurality of bytes. The bytes provide such information as identity of transmitting node, identity of transmission channel (wavelength), busy status, priority, broadcast or unicast indication, address of destination node, acknowledgment and an error check byte. These control signals must also be multiplexed and transmitted from node to node.

Prior art control signal transmission and multiplexing techniques encounter significant physical and cost constraints. In one prior embodiment, a separate transmitter wavelength is used for transmitting control packets from each node. Additional lasers must be provided for transmitting and receiving at each node. Further contributing to cost are additional optoelectronic components, such as couplers, that must also be provided.

The control signals, by definition, are not wavelength division multiplexed. They need to be time multiplexed, and are commonly multiplexed into successive time slots. It is also therefore necessary to provide a system that can handle the data rates necessary to get all the control signals to transmit within the time span of one information transmission. With foreseeable density on networks, contention for available slots in which to fit control signal packets grows. In particular prior networks, control data rates increase with the amount of network information traffic. Network control data rates can be driven in to the gigabit range. This data rates strains the capability of the most commonly available silicon technologies.

It is desirable to overcome past limitations and provide new capabilities

It is therefore a general object of the present invention to achieve control of wavelength division multiplexed broadband networks with control signals transmitted over the same optical transmissions used for data signals and to provide means for generating control signals within each node.

It is also a general object of the present invention to provide networks and node embodying means for control signal transmission and generation of the type described.

It is a more specific object of the present invention to provide a network of the type described in which control data rate does not increase as a function traffic density on the network.

It is a further object of the present invention to provide a network or node of the type described in which control and data signals for the node are carried in a single optical wavelength transmission.

It is also a further object of the present invention to provide a network or node in which the node includes means for responding to an optical transmission carrying both control and data intelligence.

It is a further object of the present invention to provide a method for use in a network or node of the type described for providing control and data signals in a single optical wavelength transmission.

It is also a further object of the present invention to provide a method for use in a network or node for responding to an optical transmission carrying both control and data intelligence.

SUMMARY OF THE INVENTION

Briefly stated, in accordance with the present invention there is provided a wavelength division multiplexed network having a plurality of nodes and having N baseband channels at wavelengths $\lambda i$, where $i=1 \ldots N$, for transmission over optical interconnection means. Each node comprises optical transmission means, such as a laser, transmitting an optical signal at wavelength $\lambda j$, where $\lambda j$ is one of said wavelengths λi different from a current transmission wavelength of another said node. Control signals are transmitted without the need for a second transmitter at each node. Data signals are provided at baseband by keying the optical signal at a data repetition rate. Control signals are imposed on a wavelength λt of a transmitting node as a subcarrier. Receiver means at each node respond to a λt from another channel to receive information. The node also includes means for receiving all wavelengths λi and demodulating the subcarrier therefrom to derive control information. Means read control signals to command appropriate node response and to provide an updated control signal with an outgoing transmission.

In the method of the present invention, an optical signal is keyed at a data repetition rate and is also subcarrier modulated to provide data and control signals respectively in a single optical transmission. At a receiving node, the received light thus modulated is provided to first and second optical receivers. Data at baseband is detected from the output of the first receiver, and a control signal is detected from the output of the second receiver.

BRIEF DESCRIPTION OF THE DRAWINGS

The means by which the above objects and features of invention are achieved are pointed out with particularity in the claims forming the concluding portion of the specification. The invention, both as to its organization and manner of operation may be further understood by reference to the following description taken in connection with the following drawings.

Of the drawings.

DESCRIPTION OF THE PREFERRED EMBODIMENTS

Figure 1:
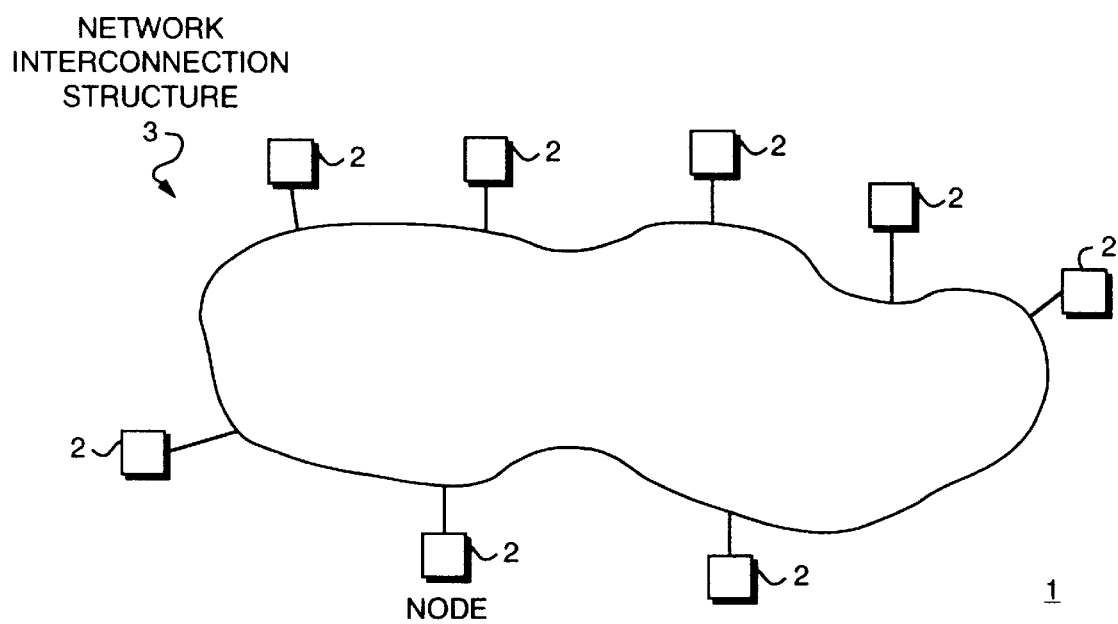
FIG. 1 is an illustration of a network comprising the present invention.

Referring now to FIG. 1, there is illustrated a network 1. The network 1 comprises nodes 2 each connected to a network interconnection structure 3. The network structure 1 may comprise a conventional topology such as a ring network, a star or a bus. Such forms of networks are well-known and well-documented in the art. In the network 1, N optical channels are multiplexed on an optical fiber. The channels each have a center wavelength λi, where i=1 ... N. For purposes of the present disclosure, each node 2 will be described as receiving information transmitted at a wavelength λr, and transmitting at a wavelength λt, where λr and λt are selected ones of the wavelengths λi.

Figure 2:
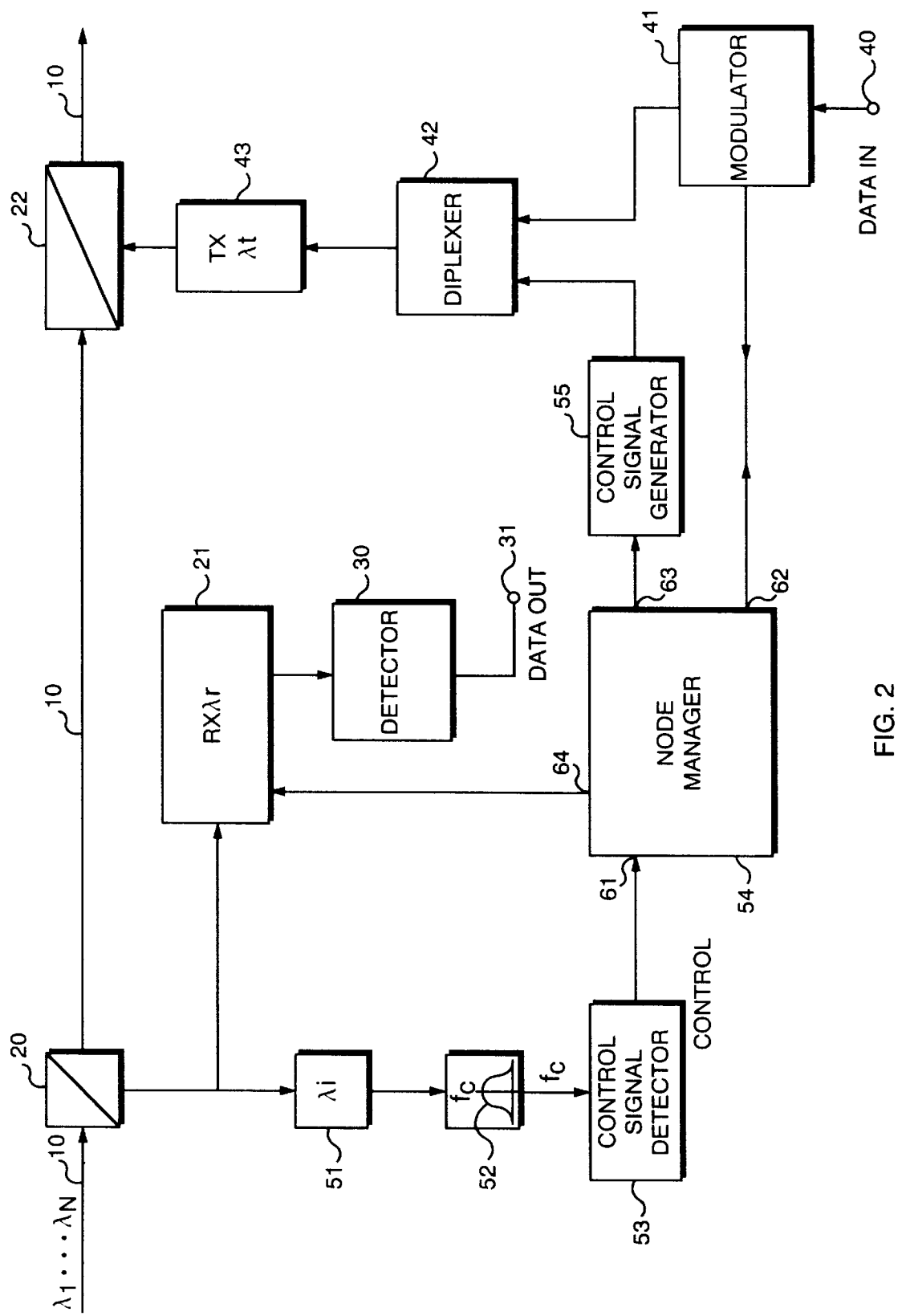
FIG. 2 is a block diagrammatic representation of a node constructed in accordance with the present invention.

FIG. 2 is a block diagrammatic representation of each node 2. An optical fiber 10 carries wavelength division multiplexed optical signals. An optical tap 20 couples light from the fiber 10 to the node 2 as further described below so that the node 2 can receive information and a control signal. An optical wavelength multiplexer 22 couples optical signals from the node 2 to the optical fiber 10.

In order to detect information, received light is coupled to an optical receiver 21 tuned to λr. The optical receiver 21 may conveniently comprise a solid state laser. Response is selected to be narrow and is centered at λr. The optical receiver 21 may be fixed or may be wavelength tunable. A detector 30 coupled to the output of the optical receiver 21 responds to information at a data frequency fd carried on the optical signal. Data is provided at a data output terminal 31.

Information to be transmitted is coupled to a data input terminal 40. A modulator 41 having the data input terminal 40 at its input provides a digital bit stream at a data repetition rate $d_r$. This data rate corresponds to a frequency of $f_d$, which will comprise a baseband. The digital bit stream comprises a data signal coupled by a conventional diplexer 42 to an optical transmitter 43. Generally, the optical transmitter 43 will comprise a solid state laser, and may be a distributed feedback, DFB, laser. Diplexer 42 also couples to the optical transmitter 43 a control signal as described below. The output of the optical transmitter 43 is at λt, and is combined by the wavelength multiplexer 22 for transmission on the optical fiber 10. The data signal keys the optical transmitter 43 on and off to provide a signal at baseband. The signal at baseband is transmitted over each of the wavelengths λi.

In accordance with the present invention, the optical tap 20 couples a portion of the light in the fiber 10 to an optical receiver 51. The optical receiver 51 is selected to have a broad response. Further in accordance with the present invention, and as further described below, the optical signal in each of the baseband channels has a subcarrier at a frequency $f_c$ impressed thereon. The output of the optical receiver 51 is coupled to a band pass filter 52 centered at $f_c$. A control signal is detected by a control signal detector 53 receiving the frequency $f_c$.

The control signal detector 53 provides control intelligence to a node manager circuit 54. The node manager circuit 54 is comprised of a microprocessor. The node manager circuit 54 responds to control information embodied in the received light signal and also operates to provide an updated control signal. The mode manager circuit 54 reads the control signal and uses known techniques of node management. For example, well-known FDDI, fiber data distributed interface or conventional token ring techniques may be used.

The node manager 54 implements the dictates of the control signal and updates the control signal to be provided from the node 2. The control signal detected by the control signal detector 53 is connected to an input terminal 61 of ;he node manager circuit 54. Interconnections between the node manager circuit 54 and the modulator 41 and the control signal generator 55 are made at terminals 62 and 63 respectively. An updated control signal is connected to a control signal modulator 55. The control signal modulator 55 provides an output at a frequency $f_c$ which is coupled by the diplexer 42 to the optical transmitter 43. In this manner, control information is transmitted to all nodes without the need for a separate optical path for control signals.

Figure 3:
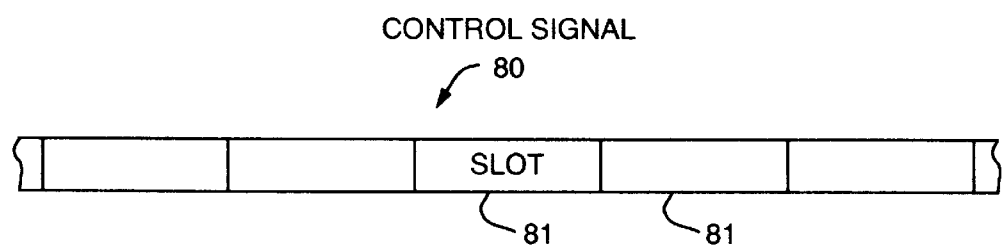
FIGS. 3 is a diagram illustrating a sequence of slots in a control channel.

FIG. 3 is a representation of a slotted control channel. A control signal 80 is comprised of serial slots 81, each corresponding to one baseband channel. A token is transmitted in each slot 81 when there is activity for the channel corresponding to that slot. The token may take well-known forms. Tokens normally embody information indicative of a channel identification, a busy status bit, a priority identifier and a broadcast or unicast indicator. The token also may comprise bits indicating address of the target node, an acknowledgment bit and a multibit error check number.

Many different token protocols may be used. In accordance with the present invention, it is significant that the control signal is "channelized." There is one token per channel. Consequently, control signal data rate will not increase as a function of network traffic.

In operation, a node 2 with a fixed wavelength transmitter 43 at a wavelength λt would "listen" for a control signal indicating that channel at λt was available for transmission. The node manager circuit 54, having been informed by the input data modulator 41 that a transmission was desired would produce a "busy" bit for inclusion in the control signal currently generated for transmission by the control signal generator 55 and the optical transmitter 43. When transmission was completed, an idle bit would be transmitted. This would inform the network 1 that the channel λt was available. Another node 2 could transmit into the now empty slot 81. Collisions with control signals for other channels is avoided. This procedure allows many nodes to share the channel j in succession for transmission of control signals.

By transmitting data at baseband and control information on a subcarrier, a wavelength division multiplexed network may be efficiently constructed and operate at data rates allowing use of common silicon components. The specification has been written with a view toward enabling those skilled in the art to develop many different forms of the invention in accordance with the above teachings.

What is claimed as new and desired to be secured by Letters Patent of the United States is:

1. A wavelength division multiplexed network having a plurality of nodes and having N channels at wavelengths λi, where i=1 . . . N, for transmission over optical interconnection means, each node comprising optical transmission means transmitting at wavelength λt, where λt is one of said wavelengths λi different from a current transmission wavelength of another node for transmitting data at baseband, data means for providing a digital bit stream at a data rate to said optical transmission means, and subchannel multiplex control means comprising a subcarrier control signal generator providing a control signal at a frequency $f_c$, diplexer means coupling both said control signal generator and said data means for modulation of said optical transmission means, each said node further comprising optical input coupling means and first and second optical receivers, said first optical receiver for responding to the wavelength λr, where λr is a wavelength transmitted by one said another node and means for detecting signals at baseband, said second receiver for responding to all values of λi and means for detecting $f_c$ therefrom and means for responding to the control signal from said another node.

2. A node for inclusion in a wavelength division multiplexed network having N nodes and N channels at wavelengths λi, where i=1 . . . N, for transmission over optical interconnection means, each node comprising: optical transmission means transmitting at wavelength λt, where λt is one of said wavelengths λi different from a current transmission wavelength of another node for transmitting data at baseband, data means for providing a digital bit stream at a data rate to said optical transmission means, and subchannel multiplex control means comprising a subcarrier control signal generator providing a control signal at a frequency $f_c$, diplexer means coupling both said control signal generator and said data means for modulation of said optical transmission means, each said node further comprising optical input coupling means and first and second optical receivers, said first optical receiver for responding to the wavelength λr, where λr is a wavelength transmitted by one said another node and means for detecting signals at baseband, said second receiver for responding to all values of λi and means for detecting $f_c$ therefrom and means for responding to the control signal from said another node.

3. In a node for inclusion in a wavelength division multiplexed network having N nodes and N channels at wavelengths λi, where i-1 . . . N, for transmission over optical interconnection means, said node comprising: optical transmission means for transmitting an optical signal at wavelength λt, where λt is one of said wavelengths λi different from a current transmission wavelength of another node, the improvement comprising: data means for switching said optical transmission means at a data repetition rate, whereby baseband data transmission is provided by said optical transmission means, and subchannel multiplex control means comprising a subcarrier control signal generator providing a control signal at a common frequency $f_c$, and diplexer means coupling both said control signal generator and said data means for modulation of said optical transmission means, whereby the control signal is included in the transmission at λt.

4. The improvement according to claim 3 in a node further comprising optical input coupling means, said improvement further comprising: first and second optical receivers, said first optical receiver for responding to the wavelength λr, where λr is a wavelength transmitted by one said another node and means for detecting signals at baseband, said second receiver for responding to all values of λi and means for detecting $f_c$ therefrom and means for responding to the control signal from said another node.

5. In a method for communicating data and control intelligence in a single optical transmission in a wavelength division multiplexed network including nodes, comprising the step of switching an optical signal provided by optical transmission means, the improvement being wherein the step of switching comprises diplexing a data signal having a data repetition rate and a control signal comprising a subcarrier to provide a diplexed output and switching the optical signal with the diplexed output for modulating the optical signal to provide a data and a control signal respectively said control signal having a frequency which is common to all nodes.

6. The improvement according to claim 5 further comprising the steps of providing at a receiving node received an optical signal produced according to claim 5 to first and second optical receivers, detecting data at baseband from the output of the first receiver and detecting a control signal from the output of the second receiver.

* * * * *